United States Patent [19]

Gales

[11] Patent Number: 5,437,534
[45] Date of Patent: Aug. 1, 1995

[54] LIFT INDEX TABLE

[75] Inventor: Charles C. Gales, Landisville, Pa.

[73] Assignee: R. R. Donnelley & Sons Company, Lisle, Ill.

[21] Appl. No.: 822,881

[22] Filed: Jan. 21, 1992

[51] Int. Cl.$^6$ ............ B65G 57/00; B65G 47/26; B42C 13/00
[52] U.S. Cl. ............ 414/789.9; 414/907; 414/788.6; 414/788.9; 414/790; 412/13; 412/37; 412/16; 198/457; 198/465.1; 198/782
[58] Field of Search ............ 412/13, 16, 37; 198/457, 782, 465.1; 414/222–226, 907, 788.6, 788.7, 790, 790.1, 790.4, 790.9, 791, 792.4, 794.8, 795, 789.9, 788, 907

[56] References Cited

U.S. PATENT DOCUMENTS

| | | |
|---|---|---|
| 3,263,795 | 8/1966 | Asp et al. ............ 414/907 |
| 3,269,565 | 8/1966 | Kemp, Jr. ............ 414/795.2 |
| 3,771,185 | 11/1973 | Thorp et al. . |
| 3,966,185 | 6/1976 | McCain et al. . |
| 4,140,052 | 2/1979 | Meier ............ 414/907 |
| 4,237,569 | 12/1980 | Muller . |
| 4,326,624 | 4/1982 | Ewertowski et al. ............ 198/465.1 |
| 4,373,840 | 2/1983 | Miller, Jr. . |
| 4,500,241 | 2/1985 | Peters et al. ............ 412/37 |
| 4,547,112 | 10/1985 | Steinhart ............ 414/907 |
| 4,555,876 | 12/1985 | Ohtake ............ 414/790.4 |
| 4,564,185 | 1/1986 | Hamlin et al. ............ 412/13 |
| 4,657,465 | 4/1987 | Aoki ............ 414/907 |
| 4,746,005 | 5/1988 | Bihary et al. . |
| 4,787,816 | 11/1988 | Cawley et al. ............ 414/789.5 |
| 4,850,783 | 7/1989 | Maekawa . |
| 4,928,806 | 5/1990 | Anderson et al. . |

FOREIGN PATENT DOCUMENTS

| | | | |
|---|---|---|---|
| 580161 | 7/1959 | Canada ............ | 412/37 |
| 282459 | 9/1988 | European Pat. Off. ............ | 198/782 |
| 274602 | 12/1989 | Germany ............ | 198/782 |
| 2042458 | 9/1980 | United Kingdom ............ | 414/790.4 |
| 818916 | 4/1981 | U.S.S.R. ............ | 412/16 |

Primary Examiner—Michael S. Huppert
Assistant Examiner—R. B. Johnson
Attorney, Agent, or Firm—Marshall, O'Toole, Gerstein, Murray & Borun

[57] ABSTRACT

In order to maintain the quality of lifts in a binding line, particularly while they are being conveyed and/or accumulated between the stacker and palletizing robot, a binding line lift index system is provided. The system includes a rotary index table having a plurality of lift index stations each of which is adapted to receive a lift of books from a stacker at an infeed index position and each of which is designed to minimize relative motion between books in a lift as the lift index stations are moved in index fashion from the infeed index position to an outfeed index position remote from the stacker. For this purpose, and particularly for loose lifts of saddlestitched books, the lifts are compressed at an intermediate index position between the infeed and outfeed index positions.

15 Claims, 3 Drawing Sheets

LIFT INDEX TABLE

FIELD OF THE INVENTION

The present invention is directed generally to a binding line lift index system and, more particularly, to a lift index system suitable for handling loose lifts of saddlestitched books on a binding line or the like.

BACKGROUND OF THE INVENTION

In recent years, many large circulation periodicals have appeared which require rapid handling of the portions of the periodicals which consist of signatures that are typically gathered for binding, trimmed, bundled for shipping, and thereafter shipped. A typical operation utilizes a multitude of inserter pockets, each of which receives signatures seriatim from a signature supply means, opens each signature, and drops the signatures to successively straddle a gathering chain which runs in front of the inserter pockets and carries the complete collection of gathered signatures to a location for further processing to complete the binding process. Moreover, because of the need for highly efficient plant operations, there has been a constant effort to increase the speed at which machines operate which has required the development of new techniques for handling the signatures at all stages of the binding process.

Typically, a binding line will have a stacker at a point downstream of the trimmer adapted to create loose lifts of books up to a pre-selected height. Thereafter, the loose lifts may be palletized by manually piling down the loose lifts onto suitable pallets. Conventionally, the palletizing has been a manual operation that is less than entirely satisfactory due to the costs, associated therewith.

In an effort to reduce the degree of manual labor, there has been a significant effort to successfully implement the use of robotics. It is known, generally, that robots can often perform repetitive functions such as palletizing by the utilization of available computer control systems. However, in a binding line, there are a number of problems that must be addressed in delivering the books to a robot.

In the case of loose lifts of books, these problems include the ability to maintain the quality of the lifts especially for saddlestitched books. It is generally known to be difficult if not impossible to maintain suitable lift quality for loose lifts of saddlestitched books which are being conveyed and/or accumulated between the stacker and a palletizing robot where automatic handling of the non-unitized (no strap or wrap) lifts is involved. In this connection, the loose lifts are well-known for creating a significant degree of backbone build-up which contributes to this difficulty.

In addition, keeping with the characteristics of saddlestitched products, there has been no available means for seating adjacent books with respect to each other, which might otherwise create more cohesive lifts.

The present invention is directed to overcoming one or more of the foregoing problems and achieving one or more of the resulting objects as established by the development of the unique lift index system described herein.

SUMMARY OF THE INVENTION

It is a principal object of the present invention to provide a binding line lift index system which maintains lift quality. It is a further object of the present invention to provide a lift index system suitable for loose lifts of saddlestitched books on a binding line. It is an additional object of the present invention to provide a lift index system operable between a stacker and a palletizing robot.

Accordingly, the present invention is directed to a binding line lift index system which includes a rotary index table provided with a plurality of lift index stations. The lift index stations are each adapted to receive a lift of books from a stacker at an infeed index position and each includes means for minimizing relative motion between books in a lift as the lift index stations are moved in index fashion from the infeed index position to an outfeed index position remote from the stacker. Still additionally, the binding line lift index system includes means for driving the rotary index table in index fashion for moving the lift index stations thereon.

Preferably, the binding line lift index system incudes means for compressing lifts of books at an intermediate index position between the infeed and outfeed index positions as well as means for ejecting lifts of books from the lift index stations of the rotary index table at the outfeed index position. It is also advantageous according to the preferred embodiment to have a pick-up station adjacent the rotary index table for receiving lifts of books from the lift index stations. Still additionally, the rotary index table preferably includes four lift index stations each of which is movable in index fashion to four separate index positions and each of which includes a lift rear support surface and a pair of lift side support surfaces for minimizing relative book motion therein.

In a highly preferred embodiment, the compressing means includes a pneumatic cylinder disposed above the rotary index table at the intermediate index position and the ejecting means includes a pneumatic cylinder disposed behind the outfeed index position for ejecting loose lifts from the lift index stations. It is also advantageous to have means for adjusting the relative positions of the rear and side support surfaces of the respective lift index stations each of which preferably includes a plurality of rollers for receiving, supporting and ejecting loose lifts of saddle-stitched books. Similarly, the pick-up station preferably includes a plurality of rollers for receiving loose lifts of saddlestitched books from the lift index stations and the system further includes means opposite the ejecting means for stopping loose lifts of saddlestitched books on the pick-up station rollers.

Other objects, advantages and features of the present invention will become apparent from a consideration of the following specification taken in conjunction with the accompanying drawings.

DETAILED DESCRIPTION OF THE PREFERRED EMBODIMENT

Figure 1:
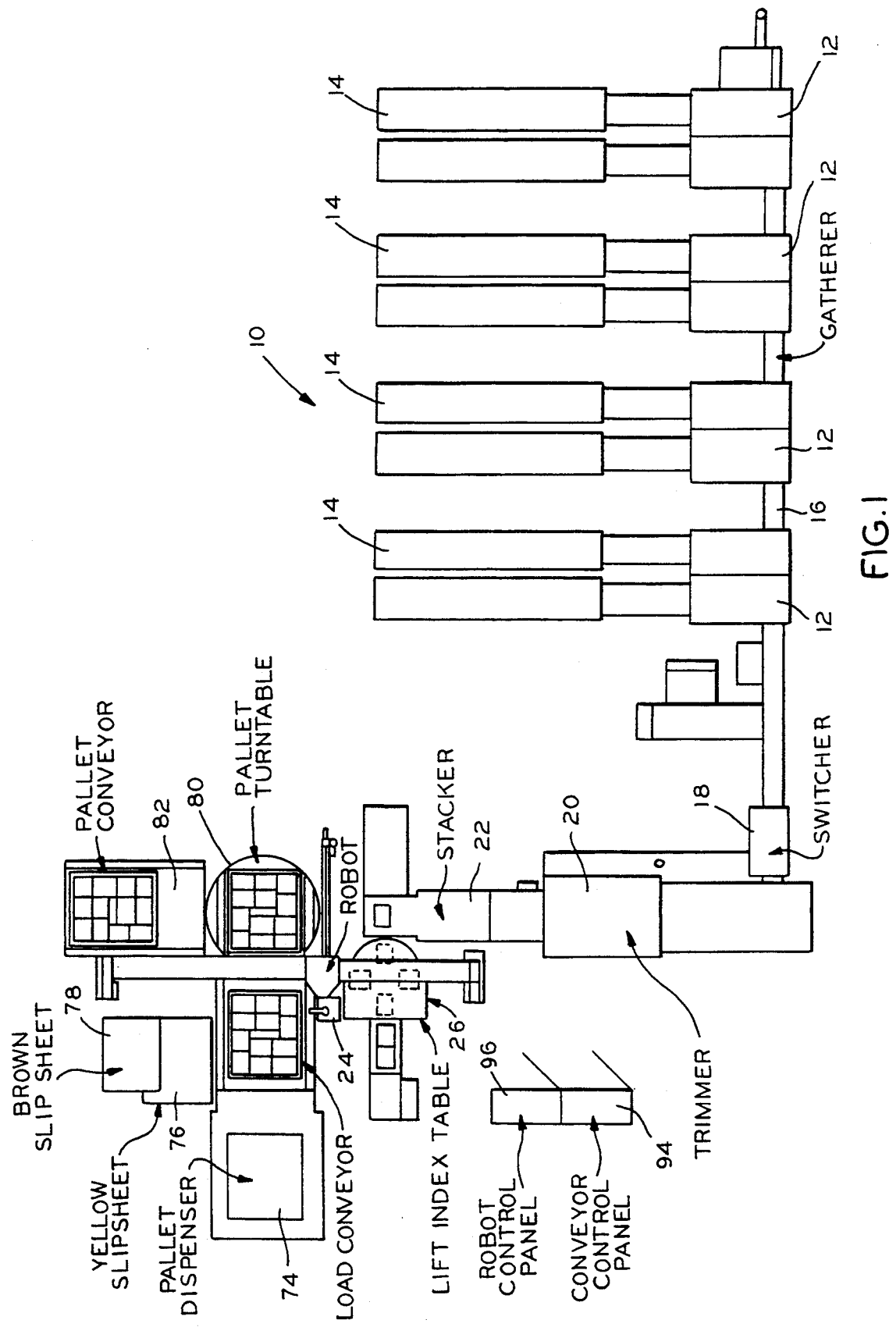
FIG. 1 is a schematic plan view of a binding line having a lift index system in accordance with the present invention.

In the illustration given, and with reference first to FIG. 1, the reference numeral 10 designates generally a binding line. The binding line 10 includes a plurality of inserter pockets 12, each of which receives signatures seriatim from a signature supply means 14 and delivers the signatures to a conveyor belt or, alternatively, gathering chain 16 which runs in front of the inserter pockets 12 and carries the complete collection of gathered signatures to a stitcher 18 which redirects the gathered signatures to a trimmer 20 and, then, to a stacker 22. From the stacker 22, the signatures are delivered to a palletizing robot 24 by a lift index system 26 in accordance with the present invention.

Figure 2:
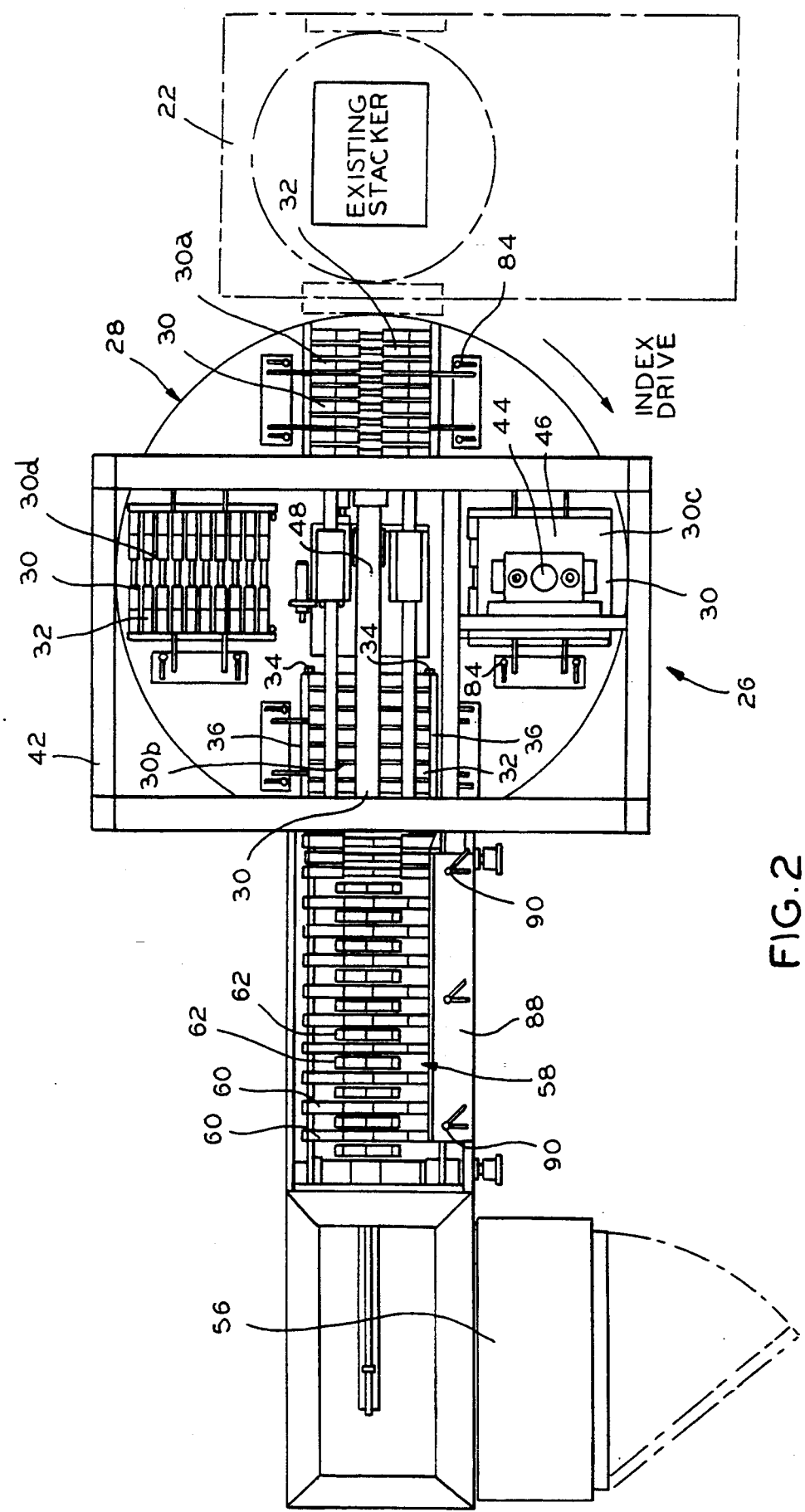
FIG. 2 is a plan view of the lift index system portion of the binding line which has been illustrated in FIG. 1.
Figure 3:
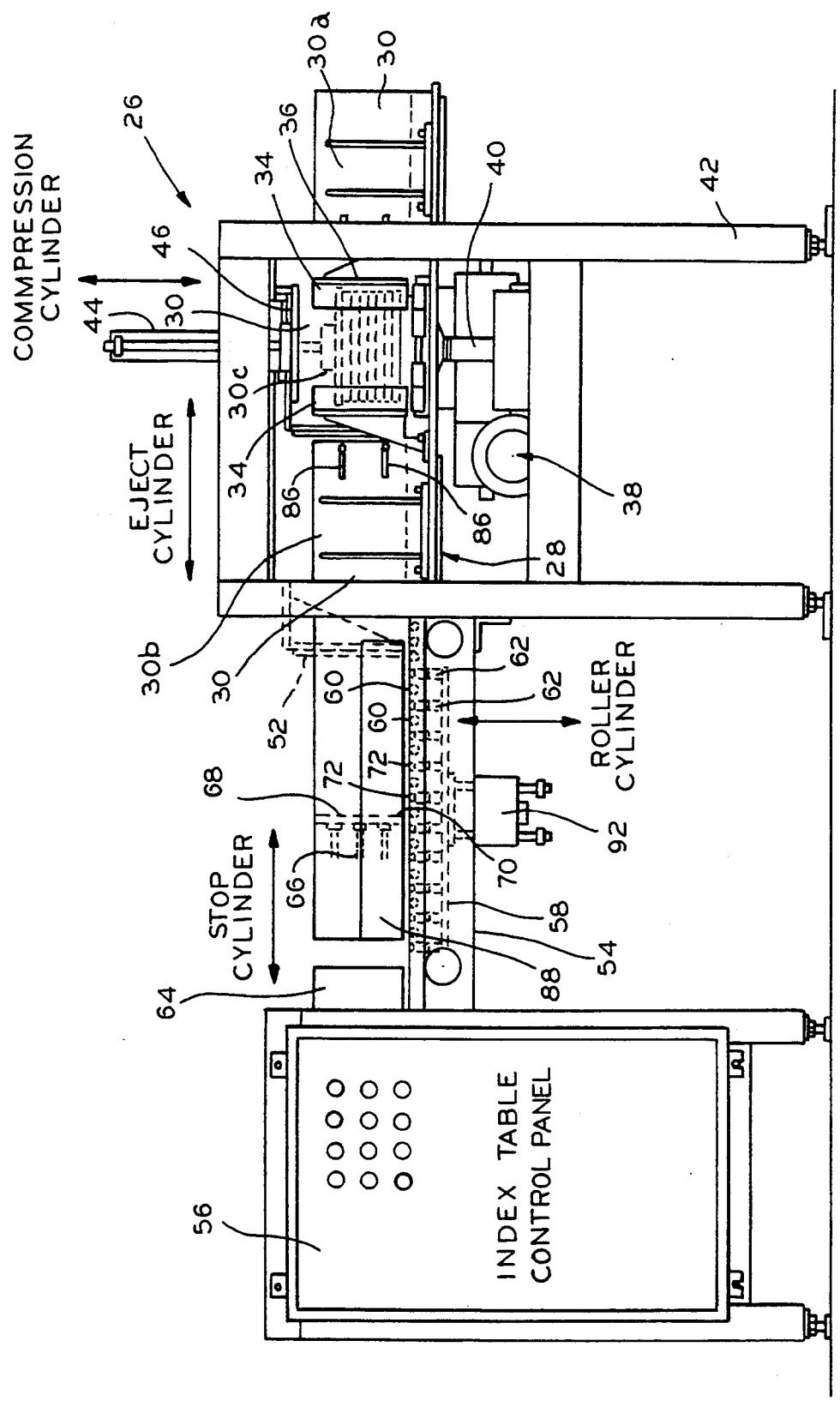
FIG. 3 is an elevational view of the lift index system portion of the binding line which has been illustrated in FIG. 1.

Referring to FIGS. 2 and 3, the lift index system 26 includes a rotary index table 28 having a plurality of lift index stations 30. The lift index stations 30 each are adapted to receive a lift of books (see FIG. 3) from the stacker 22 at an infeed index position 30(a) and each include means for minimizing relative motion between books in a lift as the lift index stations 30 are moved in index fashion from the infeed index position 30(a) to an outfeed index position 30(b) remote from the stacker 22. In addition, the lift index system 26 will also be understood to include means for driving the rotary index table 28 in index fashion.

Still referring to FIGS. 2 and 3, the lift index system 26 is particularly well suited for handling loose lifts of saddlestitched books. It will also be seen, and with reference to FIG. 2, that in a preferred embodiment the rotary index table 28 has four lift index stations 30 thereon each of which is movable in index fashion to each of four separate index positions including the infeed index position 30(a) and the outfeed index position 30(b) as well as an intermediate index position 30(c) and a return index position 30(d). As will be appreciated from FIG. 2, the rotary index table 28 is adapted to be driven in a clockwise direction in the embodiment that has been illustrated.

As shown, the lift index stations 30 each include a plurality of rollers 32 for receiving, supporting and ejecting loose lifts of saddlestitched books. It will also be appreciated from FIG. 3 that each of the lift index stations 30 include a lift rear support surface 34 as well as a pair of lift side support surfaces 36 which serve to minimize relative motion between saddlestitched books in a loose lift as the lift index stations 30 are moved in index fashion from the infeed index position 30(a) to the outfeed index position 30(b). In a highly preferred embodiment, the infeed index position 30(a) is positioned directly opposite the outfeed index position 30(b).

As shown in FIG. 3, the lift index system 26 includes means for driving and stopping the rotary index table 28 in index fashion in the form of a motor driven cam index drive mechanism generally designated 38. The details of this mechanism, which is operatively associated with the rotary index table 28 through a shaft 40 or the like, have not been shown inasmuch as it may take various different forms all of which will be apparent to those skilled in the art after understanding the unique attributes of the present invention as described in detail herein. As shown also in FIG. 3, the lift index system 26 will further include a frame 42 that will support not only the motor driven cam index drive mechanism 38 but the other components thereof, as well.

Referring to FIG. 3, the lift index system 26 also includes means for compressing loose lifts of saddlestitched books preferably at the intermediate index position 30(c) (see FIG. 2). More specifically, the compressing means is advantageously located between the infeed and outfeed index positions 30(a) and 30(b). Still additionally, the compressing means preferably includes a pneumatic cylinder 44 above the rotary index table 28 for vertically displacing a compression plate 46 on command.

Still referring to FIG. 3, the lift index system 26 also preferably includes means for ejecting loose lifts of saddlestitched books from the lift index stations 30 at the outfeed index position 30(b). This ejecting means may advantageously include a pneumatic cylinder 48 of the type sold by Origa as its P 120 Series (see FIG. 2) connected through a conventional reciprocating piston (not shown) to an ejection plate 52 which pushes or ejects loose lifts from the lift index stations 30 onto a pick-up station generally designated 54. As will be appreciated, the operation of these various components including synchronization of movement may be suitably computer controlled by an index table control panel 56.

As shown in FIGS. 2 and 3, the pick-up station 54 is suitably positioned adjacent the rotary index table 28 for the purpose of receiving loose lifts of saddlestitched books from the lift index stations 30 as they are ejected by the ejecting cylinder 48. The pick-up station 54 includes a plurality of rollers generally designated 58 which may include a first set of fixed rollers 60 and a second set of retractable rollers 62 and the pick-up station 54 advantageously includes a sufficient number of the rollers so as to be able to receive at least two loose lifts of saddlestitched books. As shown in FIG. 2, the first and second sets of rollers 60 and 62 are disposed in alternating relation such that the rollers 62 can be retracted to create spaces between adjacent rollers of the first set 60 for insertion of robot fingers.

Still further, the pick-up station 54 preferably includes means opposite the ejection plate 521 for stopping the loose lifts of saddlestitched books which may preferably take the form of a stop cylinder 64 which drives a piston 66 having a stop plate 68 thereon. In a most highly preferred embodiment, the stop plate 68 stops a first loose lift of saddlestitched books in a first position 70 on the rollers 60 and 62 and thereafter retracts with the first loose lift to a point nearer the stop cylinder 64 for stopping a second loose lift of saddlestitched books in the first position 70 on the rollers 60 and 62. As will be appreciated, this permits the accumulation of two loose lifts of saddlestitched books on the pick-up station 54. These two loose lifts will be in contacting side by side adjacent relation and, when they are in the position intended by result of the action of the ejecting cylinder 48 and the stop cylinder 64, the rollers 62 are retracted to create the spaces between adjacent rollers 60 accommodating insertion of the robot fingers 72 (see FIG. 3). As a result of this feature, the palletizing robot 24 can then lift the two loose lifts of saddlestitched books for placement on a pallet which has previously been placed in position by means of a pallet dispenser 74 (see FIG. 1).

After the stacking of loose lifts of saddlestitched books on a pallet has been completed including placement of the corresponding yellow and brown slip sheets 76 and 78, respectively, the fully loaded pallet can be conveyed to the pallet turntable 80 where it is subsequently delivered to the pallet conveyor 82.

Referring once again to FIGS. 2 and 3, the lift index system 26 may advantageously include means for adjusting the positions of the support surfaces 34 and 36 to accommodate different sizes of saddlestitched books. This may take the form of appropriate slot and fastener arrangements 84 and 86 which permit expansion and retraction of the spacing between plates 36 and the position of plates 34 in relation to the lift index stations 30. In addition, the pick-up station 54 may include an adjustable back stop 88 having similar slot and fastener adjustment arrangements 90 for loose lifts of saddlestitched books on rollers 60 and 62.

As will be appreciated, the rollers 62 may be retracted by an appropriate pneumatic cylinder arrangement 92. The operation of all of the pneumatic cylinders 44, 48, 64 and 92, as well as the synchronization of the motor driven cam index drive mechanism 38., can be powered and controlled by a computer system such as the index table control panel 56, and the pallet dispenser 74 can be controlled by a conveyor control panel 94. As also shown in FIG. 1, the robot can be controlled by a robot control panel 96.

Throughout the foregoing description, the lift index system 26 has been described for use with loose lifts of saddlestitched books. It will be appreciated, however, that the lift index system can have broader applicability even though its unique attributes are particularly well suited for saddlestitched books. In the case of saddlestitched books, the pneumatic cylinder 44 squeezes air out of the loose lift decreasing the amount of backbone build-up in the lift.

As will be appreciated from the foregoing, the compression also helps seat adjacent books with respect to each other which, in turn, creates a far more cohesive lift. As a result, the lift index system 26 is capable of maintaining the quality of lifts as they are conveyed and/or accumulated between the stacker and palletizing robot.

As will also be appreciated from the foregoing, the lift index system 26 minimizes relative motion between lifts and conveying equipment by use of the rotary index table 28 and all starts and stops take place while the lifts are contained on three sides.

While in the foregoing there has been set forth a preferred embodiment of the invention, it will be appreciated that the details herein given may be varied by those skilled in the art without departing from the true spirit and scope of the appended claims.

I claim:

1. In a binding line with means to make books with a backbone, and a stacker adapted to form a loose lift of said books wherein the improvement comprises:

a horizontal rotary index table with a plurality of separate lift index stations and spaced infeed and outfeed index positions, each of said lift index stations includes horizontal support means adapted to receive and support a loose lift of said books from said stacker at said infeed index position, each of said lift index stations also including means for minimizing relative motion between the books in a loose lift as said lift index stations are moved in an index fashion from said infeed index position to said outfeed index position remote from said stacker, and means for driving said horizontal rotary index table in said index fashion;

means for compressing a loose lift of said books to decrease the backbone buildup at an intermediate index position between said infeed and outfeed index positions;

means for horizontally ejecting loose lifts of books from said lift index stations of said rotary index table at said outfeed index position; and said means for minimizing relative motion between the books in a loose lift includes a loose lift rear support means and a pair of loose lift side support means, and means for adjusting the positions of at least said side support means to receive different sizes of said loose lifts of books.

2. The book binding line of claim 1 wherein said horizontal rotary index table includes four lift index stations each moveable in index fashion to four separate index positions.

3. The book binding line of claim 1 wherein said means for driving said horizontal rotary index table includes a motor driven cam index drive mechanism operatively associated therewith.

4. The book binding line of claim 1 including a pick-up station adjacent said outfeed index position of said horizontal rotary table for receiving loose lifts of books from said lift index stations.

5. The book binding line of claim 1 wherein said compressing means includes a pneumatic cylinder disposed above said horizontal rotary index table at said intermediate index position.

6. The book binding line of claim 1 including means for adjusting the relative position of said rear support means to accommodate different sizes of loose lifts of books.

7. The book binding line of claim 1 wherein each of said lift index stations includes a plurality of rollers for receiving and supporting loose lifts of books.

8. The book binding line of claim 1 wherein said ejecting means includes a pneumatic cylinder disposed behind said outfeed index position for ejecting loose lifts of books from said lift index stations.

9. The book binding line of claim 1 wherein said books are of the saddlestitched type.

10. The book binding line of claim 1 further including a signature supply source, a gatherer and a stitcher.

11. The book binding line of claim 4 wherein said pick-up station includes a plurality of rollers for receiving loose lifts of books from said lift index stations of said horizontal rotary index table.

12. The book binding line of claim 11 wherein said compressing means includes a pneumatic cylinder located above said horizontal rotary index table at said intermediate index position and said ejecting means includes a pneumatic cylinder behind said outfeed index position for ejecting loose lifts of books from said lift index stations onto said rollers of said pick-up station.

13. The book binding line of claim 11 wherein said pick-up station includes means opposite said ejecting means for stopping a first loose lift of books in a first position on said rollers and thereafter retracting with said first loose lift for stopping a second loose lift of books in said first position on said rollers.

14. The book binding line of claim 11 wherein said rollers of said pick-up station include a first set of fixed rollers and a second set of retractable rollers, said first and second sets of rollers being disposed in alternating relation such that said second set of rollers can be retracted to create spaces between adjacent rollers of said first set for insertion of robot fingers, and means for alternating the position of said second set of rollers of said pick-up station.

15. The book binding line of claim 11 wherein said pick-up station has a sufficient number of said rollers to receive, simultaneously, at least two loose lifts of said books.

* * * * *